United States Patent [19]

Chang et al.

[11] 4,219,322

[45] Aug. 26, 1980

[54] APPARATUS FOR MOLDING PLASTIC ARTICLES

[75] Inventors: Long F. Chang; Robert F. Kontz, both of Toledo, Ohio

[73] Assignee: Owens-Illinois, Inc., Toledo, Ohio

[21] Appl. No.: 971,279

[22] Filed: Dec. 20, 1978

Related U.S. Application Data

[62] Division of Ser. No. 826,300, Aug. 22, 1977, Pat. No. 4,150,088.

[51] Int. Cl.² ............................ B29C 1/00; B29F 1/00
[52] U.S. Cl. ............................ 425/547; 425/555; 425/576; 425/588
[58] Field of Search ............ 425/134, 357, 359, 576, 425/588, 577, 561, 542, 555, 425, 431, 434, 469, 582, 574, 589, 594, 360, 359-361, 416, 419, 423, 468; 264/538, 328, 513

[56] References Cited

U.S. PATENT DOCUMENTS

| | | | |
|---|---|---|---|
| 2,217,336 | 10/1940 | Eden | 264/230 |
| 2,351,774 | 6/1944 | McGowen | 425/576 |
| 2,617,150 | 11/1952 | Rubin et al. | 264/331 |
| 3,025,567 | 3/1962 | Sherman | 425/561 |
| 3,218,375 | 11/1965 | Hardwick | 264/DIG. 83 |
| 3,374,500 | 3/1968 | Drenning | 425/576 |
| 3,375,553 | 4/1968 | Criss | 264/329 |
| 3,436,446 | 4/1969 | Angell | 264/45.5 |
| 3,604,059 | 9/1971 | Liddell | 425/416 |
| 3,670,066 | 6/1972 | Valyi | 264/328 |

FOREIGN PATENT DOCUMENTS

| | | | |
|---|---|---|---|
| 2548752 | 5/1976 | Fed. Rep. of Germany | 425/555 |
| 7119879 | 6/1971 | France | 425/555 |

*Primary Examiner*—W. E. Hoag
*Attorney, Agent, or Firm*—Charles S. Lynch; Myron E. Click; David H. Wilson

[57] ABSTRACT

A apparatus are disclosed for molding plastic articles, wherein the method includes the steps of filling a mold cavity at a first station with heated flowable plastic material and then displacing the mold to a second station where the plastic material is cooled under pressure. The apparatus includes a rotatable support for displacing the mold between the first and second stations, a plastic supply means at the first station to fill the molds, and a displaceable rod at the second station for insertion into the mold to apply pressure to the plastic material during solidification cooling.

4 Claims, 3 Drawing Figures

APPARATUS FOR MOLDING PLASTIC ARTICLES

This is a division of application Ser. No. 826,300, filed Aug. 22, 1977, now U.S. Pat. No. 4,150,088, issued Apr. 17, 1979.

BACKGROUND OF THE INVENTION

1. Field of the Invention

This invention relates generally to a method and apparatus for molding thermoplastic articles, and more particularly to a method and apparatus for filling a mold cavity at one station and then transferring the mold to a second station where pressure is applied to the thermoplastic material for curing.

2. The Prior Art

Various molding assemblies and methods have been disclosed and utilized in the prior art to form thermoplastic articles by injection molding. Typically, the methods include injecting thermoplastic material at relatively high pressure through a rather small sprue opening into a mold cavity and then thermally conditioning the material in the mold at a fixed position adjacent the injection assembly. Certain patents, such as U.S. Pat. No. 3,270,383, have disclosed the use of relatively large sprue openings in the injection process; while a larger group of patents have generally disclosed the concept of transferring thermoplastic material from an accumulator at relatively low injection pressures. Representative of this last group of patents are U.S. Pat. Nos. 3,231,656, 3,453,353, 3,280,236, 3,433,862, 3,947,203, 3,375,553, 3,196,198, and 3,092,440. In a related area, Patents such as U.S. Pat. Nos. 3,670,066 and 3,270,383 have disclosed the concept of applying pressure to thermoplastic material within a mold cavity, but only for the limited purpose of accounting for shrinkage.

This state of the art has resulted in several previously unsolved problems, as follows:

"Flashing" of the plastic material generally occurs between the mold and the accumulator, even in those methods involving low injection pressures because a high packing pressure is applied to the material in the mold before the material cools from a heated flowable condition.

Heat is transferred between the cooled mold and the adjacent heated accumulator, resulting in (a) cold slugs in the accumulator and (b) increased cycle time to properly cool the material in the mold.

Plastic material has been subject to degradation due to high injection pressures, high packing pressures, and unnecessarily prolonged cycle times.

Additionally, large hydraulic clamping equipment has been required to maintain the molds closed during both the injection cycle and the cooling cycle. As is common knowledge, such equipment is not only expensive to purchase and operate, but also requires frequent maintenance.

SUMMARY OF THE INVENTION

The present invention overcomes those prior art problems and disadvantages in a method and apparatus, wherein a mold cavity is filled at one station with plastic material at low pressure and is then transferred to a second station to cool the material under pressure.

More specifically, the method includes filling an internal mold cavity at a first station with heated, flowable plastic material. Then, the mold is moved from the first station to a second station in alignment with a displaceable rod, which is inserted into an opening in the mold to apply pressure to the plastic material while the plastic is cooled to a self-sustaining state. Thereafter, the plastic material is removed from the mold cavity as a molded article, and the mold is moved back, to the first station to receive additional plastic material.

The disclosed apparatus includes a rotatable support member having a plurality of molds mounted on its periphery in circumferentially spaced relationship. A first station adjacent the periphery of the support includes a supply means for filling the molds with plastic material in a heated flowable condition. A second station adjacent the circumferential periphery of the support but spaced from the first station includes an axially reciprocal rod which may be advanced into a sprue opening in the molds by a fluid power means in order to apply pressure to the plastic material during cooling.

In the preferred embodiment, the molds include a female mold component and a vertical core pin which cooperate to define a tubular, vertical cavity. Additionally, a sprue opening is provided at the top of each mold to accommodate the injection of thermomplastic material into the mold at the first station and to closely receive the rod at the second station.

Accordingly, the present invention embodies a significant advance over the prior art for at least the following reasons:

(1) A significant reduction in flash may be achieved because the plastic material is injected into the mold cavity at a relatively low pressure and because the pressure imposed upon the plastic material by the rod at the second station may initially be nominal;

(2) Improved cycle times may be achieved due to the elimination of heat transfer between the accumulator and mold and due to the efficient use of the plasticizer and accumulator;

(3) The pressure imposed on the material during cooling may be carefully regulated by the physically separated curing station in order to minimize material degradation in materials such as polyethylene terephthalate, which is susceptible to crystallization and to the generation of aldehydes;

(4) The cost of the molding equipment may be reduced because large clamping equipment may be eliminated and because the mold can be made much lighter; and (5) Shear stresses may be minimized during the injection cycle due to the use of an enlarged sprue opening.

These and other meritorious features and advantages will be more fully appreciated from the following detailed description and the appended claims.

DETAILED DESCRIPTION OF THE PREFERRED EMBODIMENT

Figure 1:
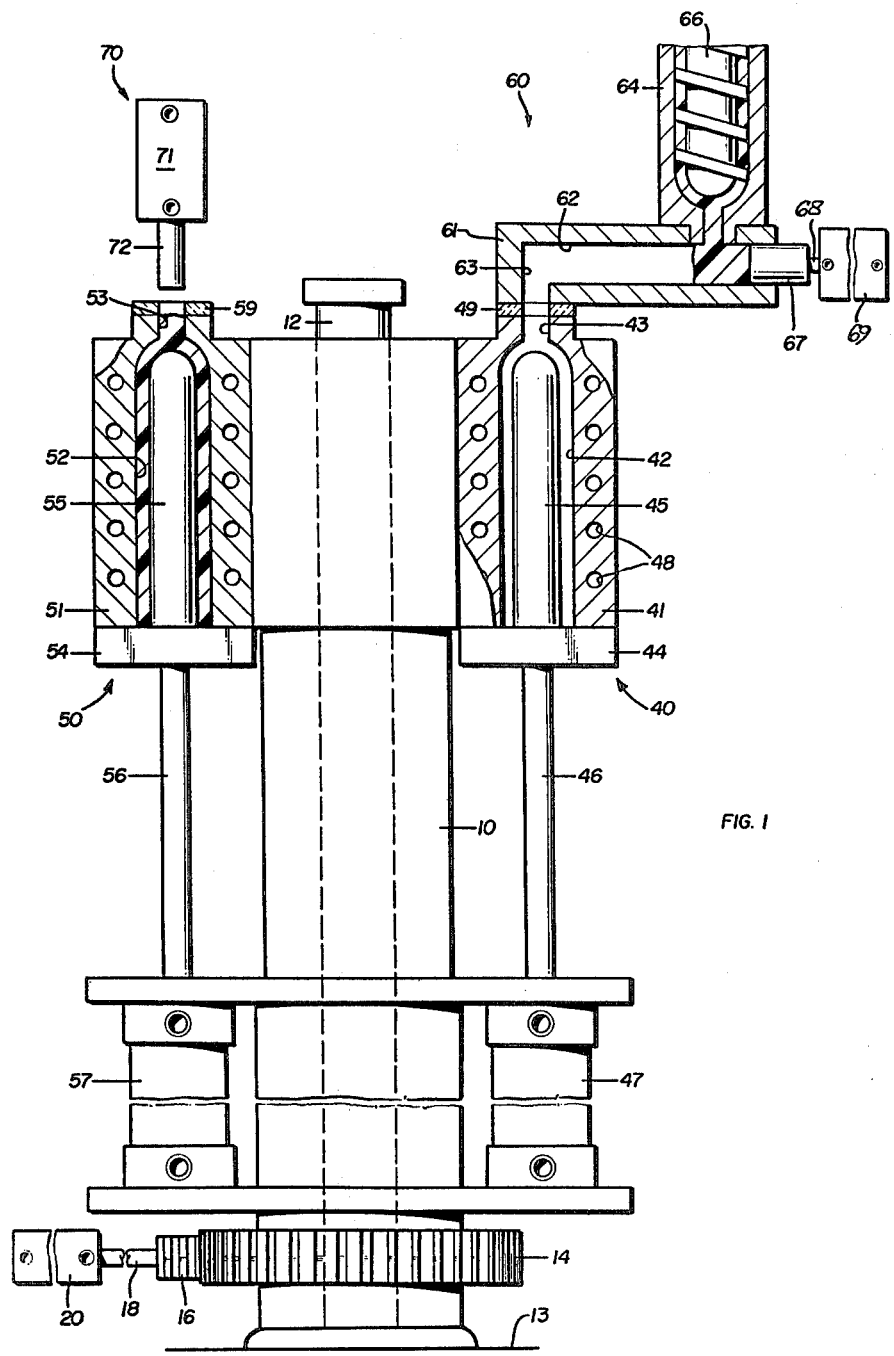
FIGS. 1—3 schematically illustrate the assembly proposed by this invention at various phases of the molding cycle.

Referring more particularly to the drawings, the proposed apparatus generally includes a rotatable turret 10 to which two separate molding assemblies 40 and 50 are secured for displacement between an injection station 60 and a curing station 70.

The rotatable turret or support column 10 is rotationally mounted about a vertical cylindrical beam or rod 12 which is secured to base 13. A pinion 14 is integral with the bottom of turret 10 and meshes with a rack 16 which is displaced by a piston 18 of a hydraulic cylinder arrangement 20.

The mold assemblies 40 and 50 are essentially identical and therefore the description of these assemblies will be devoted primarily to mold 40, with like reference numerals in mold 50 indicating identical parts.

Mold assembly 40 includes a female mold member 41 which is suitably secured to a peripheral surface on the turret 10. The female mold includes an essentially cylindrical, vertical mold cavity 42 which blends into a sprue opening 43 at the top of the mold. A vertically movable male mold member 44 includes an elongated vertical core pin 45 which cooperates with cavity 42 to define an essentially tubular, vertical mold cavity. The male mold member is vertically displaced by an elongated piston 46 of a hydraulic cylinder 47.

As shown, the female mold member includes internal cooling ducts 48 through which fluid is circulated to cool plastic material within the mold cavity. Likewise, the elongated core pin 45 may include an internal cooling system (not shown) as is conventional in the art. For thermal segregation purposes, a layer of insulation 49 is secured to the top of the female mold 41 for purposes which will become apparent from the following disclosure.

The first station 60 includes a fixed, heated accumulator 61 which includes a main accumulator chamber 62 and a flow passageway 63, with which sprue opening 43 is selectively aligned. A suitable plasticizer 64 including a rotatable screw 65 selectively delivers plastic material in a heated, flowable condition to the accumulator 62 by way of passageway 66. An elongated, cylindrical ram closes off the opposed end of accumulator 62 and is selectively displaced by a piston 68 of a hydraulic assembly 69.

Station 70 includes a fixed hydraulic cylinder 71 and an associated vertically reciprocal pressurizing rod 72 which may be selectively advanced into the molding assemblies positioned thereunder to pack the plastic material during solidification cooling. The rod 72 is preferably on the order of about a half inch in diameter and conforms closely to the diameter of the mold sprue openings.

Figure 2:
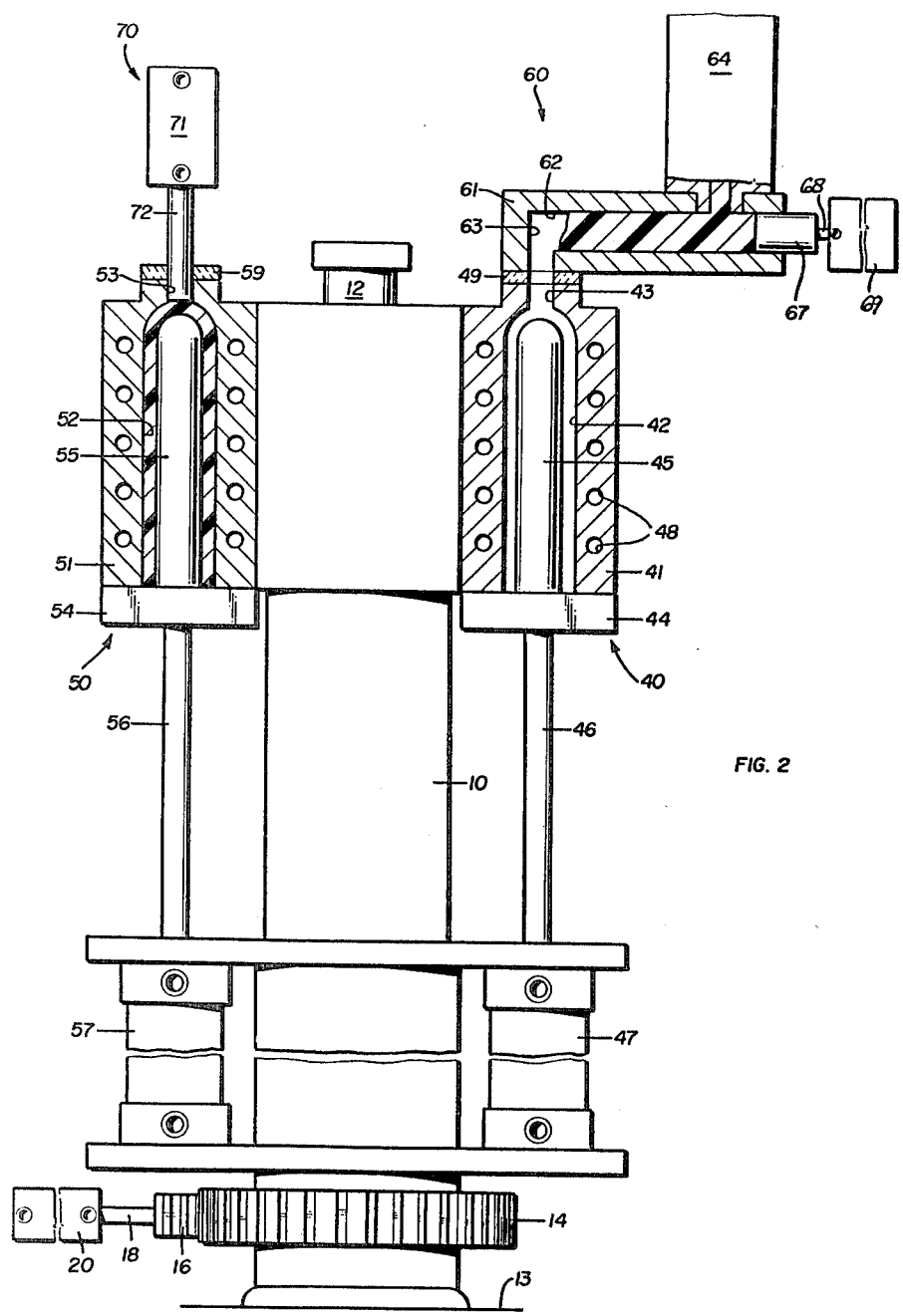

In operation, a molding cycle is initiated by retracting ram 67 from within accumulator 62 to the position shown in FIG. 1. As a result, heated, flowable plastic material is delivered into the accumulator chamber 62 from the plasticizer 64. As shown in FIG. 1, this cycle has just been initiated whereas in FIG. 2 the cycle has progressed to the point where the accumulator chamber 62 is substantially filled with plastic material. At about the time in the cycle represented by FIG. 2, or very shortly thereafter, hydraulic cylinder 69 is actuated to advance piston 68 and ram 67 into the accumulator chamber 62 to the position shown in FIG. 3 for the purpose of injecting plastic material into the mold cavity by way of sprue opening 43. As will be appreciated, optional valving (not shown) may be provided in the accumulator 61 in the region of flow passageway 63 to regulate the flow of plastic material from chamber 62 to the mold assembly.

In accordance with the present invention, the plastic material is injected into the accumulator chamber 62 from the plasticizer 64 and then into the mold cavity from the accumulator 62 at relatively low injection pressures. As a result, the injection molding temperatures may be maintained at a lower level than in prior methods, providing the advantages previously enumerated. It will be understood, of course, that pressures on the order of up to about 5,000 psi may be developed at the point in the cycle represented by FIG. 3 simply as a result of the size of the plastic shot being slightly greater than the mold cavity size. Even if this occurs, it is considered to be an incidental effect of the injection cycle and does not appear to diminish the overall advantages of the invention.

Also in accordance with the invention, the flow passageway 63 and the sprue opening 43 are both relatively large, such as on the order of about half an inch. As a result, shear stresses in the plastic material are significantly reduced.

Figure 3:
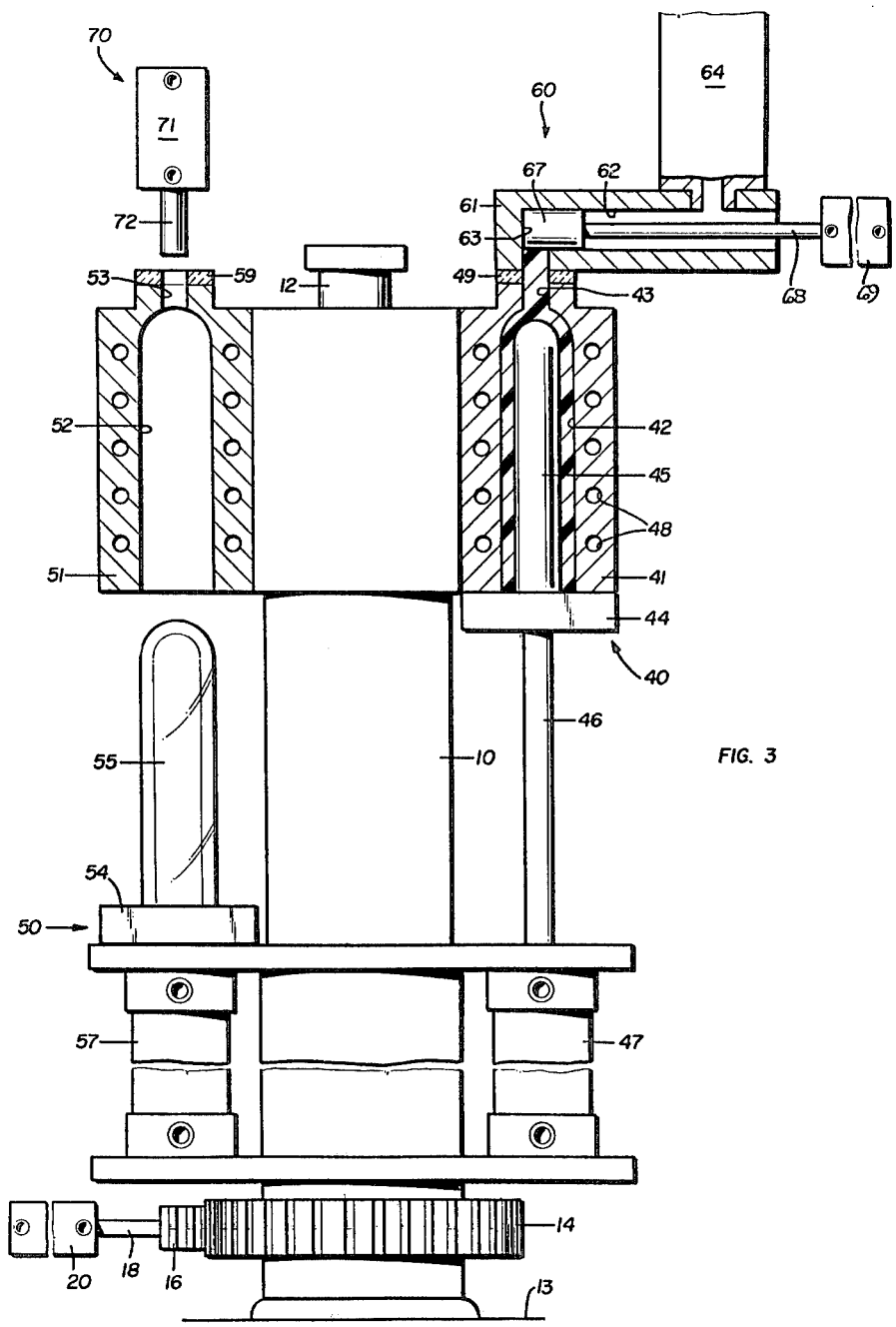

After the point in the cycle represented by FIG. 3, hydraulic cylinder 20 is actuated to advance piston 18 and rack 16 for the purpose of rotating the turret 10 and displacing mold assembly 40 to a position beneath pressurizing rod 72 as represented by the position of mold assembly 50 in FIG. 1. At about the same time, ram 67 is retracted by piston 68 back to the position shown in FIG. 1. Withdrawal of the ram 67 tends to pull plastic material within passageway 63 back into accumulator 62 and also accommodates the flow of additional plastic material from plasticizer 64.

As is conventional in the art, cooling fluid is continuously circulated through the internal cooling ducts of the mold assemblies. Thus, the cooling cycle starts as soon as plastic material is forced from the accumulator into the mold assembly. However, the plastic material is still in a heated, uncured condition as the molds are rotated from the first station 60 to the second station 70.

Referring now more particularly to mold assembly 50 to explain the operation at station 70, rotation of the turret 10 positions sprue opening 53 in vertical alignment with the pressurizing rod 72. Thereafter, hydraulic cylinder 71 is actuated to advance pressurizing rod 72 into the sprue opening to apply pressure to the plastic material within the mold cavity during the solidification cooling process.

In accordance with the invention, the pressure applied by the rod 72 may be regulated as desired. For example, either a constant low or high pressure may be applied to the material to compensate for shrinkage. Alternatively, the pressure applied by rod 72 may be varied as desired for several different purposes. For example, an initial low pressure may be applied to minimize flashing, with a higher pressure being applied after the material has cooled from a flowable condition. As another example, the pressure may be varied to control properties in thermoplastic materials, such as crystallization in polyethylene terephthalate.

After the plastic material with the mold cavity has cooled to a self sustaining condition, piston rod 56 is retracted by the hydraulic cylinder 57 to withdraw core pin 55 from the mold cavity 52 as shown in FIG. 3. Thereafter, the thermoplastic material may be stripped from the core pin in a conventional manner and then blown into a container in a blow molding operation. Next, rod 56 is extended to reposition core pin 55 within the mold cavity, and the turret 10 is rotated to repeat the process.

Having fully and completely described our invention, we now claim:

1. An apparatus for forming a plastic article, comprising:

a movable mold having an internal mold cavity and a sprue opening;

supply means at a first station for filling the internal mold cavity and sprue opening with heated, flowable plastic material;

low pressure filling means at the first station to fill the mold at a pressure of less than about 5000 psi;

displacement means for moving the mold immediately after filling from the first station to a second station where the sprue opening is in alignment with an axially reciprocal pressurizing member; and fluid power means for (a) axially displacing the pressurizing member into the sprue opening to apply pressure to the plastic material within the internal mold cavity and (b) maintaining pressure greater than the mold filling pressure on the member while the plastic material within the internal mold cavity is thermally conditioned to a self-sustaining state to provide a hollow plastic article.

2. The apparatus as defined in claim 1, including a rotatable turret interconnected to both said displacement means and the mold, said turret being mounted for rotation about an axis and the mold being movable with the turret along an arcuate path between said first and second stations.

3. A mold assembly, comprising:

a support member mounted for rotation about an axis;

a plurality of molds mounted on the periphery of the support member in circumferentially spaced relationship, with each of the molds including a sprue opening and cooling means;

a first station adjacent the circumferential periphery of the support member and including low pressure filling means for successively filling the molds with plastics material polyethylene terephthalate in heated, flowable condition at a pressure of less than about 5000 psi;

means for transferring the molds immediately after filling to a second station;

the second station being adjacent the circumferential periphery of the support member and including an axially reciprocal rod and a fluid power means for advancing the rod into the mold sprues to apply pressure to the plastic material within the molds at a pressure greater than the filling pressure while said cooling means cools the plastic material to a self-sustaining condition to obtain an hollow plastic article.

4. The apparatus as defined in claim 3, wherein each of the molds includes a female mold and a vertical core pin cooperatively defining an essentially tubular vertical cavity; and the sprues being at the top of each mold cavity.

* * * * *